United States Patent [19]
Youngblood et al.

[11] Patent Number: 5,062,059
[45] Date of Patent: Oct. 29, 1991

[54] APPARATUS AND METHOD FOR COMMUNICATION BETWEEN HOST CPU AND REMOTE TERMINAL

[75] Inventors: Gerald F. Youngblood, Jackson; Ron D. Hughes, Ridgeland; Kester B. Rice, Madison, all of Miss.

[73] Assignee: Sunriver Corporation, Austin, Tex.

[21] Appl. No.: 341,640

[22] Filed: Apr. 20, 1989

Related U.S. Application Data

[63] Continuation of Ser. No. 938,848, Dec. 8, 1986.

[51] Int. Cl.$^5$ ............................................. G06F 15/62
[52] U.S. Cl. .................................... 364/521; 364/518; 340/825.05
[58] Field of Search ........ 364/518, 521, 200 MS File, 364/900 MS File; 340/717, 721, 825.05, 825.08; 371/32, 33

[56] References Cited

U.S. PATENT DOCUMENTS

| | | | |
|---|---|---|---|
| 4,577,317 | 3/1988 | Chu et al. | 370/110.1 |
| 4,641,263 | 2/1987 | Perlman et al. | 364/900 |
| 4,665,501 | 5/1987 | Saldin et al. | 364/900 |
| 4,727,537 | 2/1988 | Nichols | 370/85 |
| 4,766,530 | 8/1988 | Roslund | 364/200 |
| 4,782,461 | 11/1988 | Mick et al. | 364/900 |
| 4,811,284 | 3/1989 | Adler et al. | 364/900 |
| 4,813,012 | 3/1989 | Valeri et al. | 364/900 |

FOREIGN PATENT DOCUMENTS

| | | |
|---|---|---|
| 109337 | 11/1982 | European Pat. Off. . |
| 228124 | 12/1985 | European Pat. Off. . |
| 57-5139 | 11/1982 | Japan . |
| 60-5371 | 11/1985 | Japan . |
| 170160 | 7/1986 | Japan . |

*Primary Examiner*—Dale M. Shaw
*Assistant Examiner*—Phu K. Nguyen
*Attorney, Agent, or Firm*—Kenneth D'Alessandro

[57] ABSTRACT

A real-time, multiuser time-share, computer system is disclosed. The computer system is particularly adapted for running computer software written for individual personal computers, including software which requires the interactive exchange of high resolution computer graphics information. Data is transferred between the host computer and remote terminals over a very high speed serial data transmission line at a rate of, for example, 25 MHz. Fiber optic duplex cables connect a host controller with one or more remote terminals. One fiber optic cable carries the data from the host controller to the remote terminal and the other cable carries data from the remote terminal to the host controller. Specially dedicated, high speed, hardwired electronic logic, such as 74F series TTL hardwired logic, encodes the software commands, transfers the data over a serial data link, and decodes the data so that slower speed hardware may direct the data to the appropriate operating hardware. The data link can connect terminals in a real time, time-share network that enables remote stations to share hardware and software written for the single user, single tasking generation of personal computer without modification to the software, including software having high resolution, interactive graphics.

2 Claims, 7 Drawing Sheets

*HOST BUS COMMAND RECEIVER*

HOST DATA COMMUNICATION TRANSMITTER

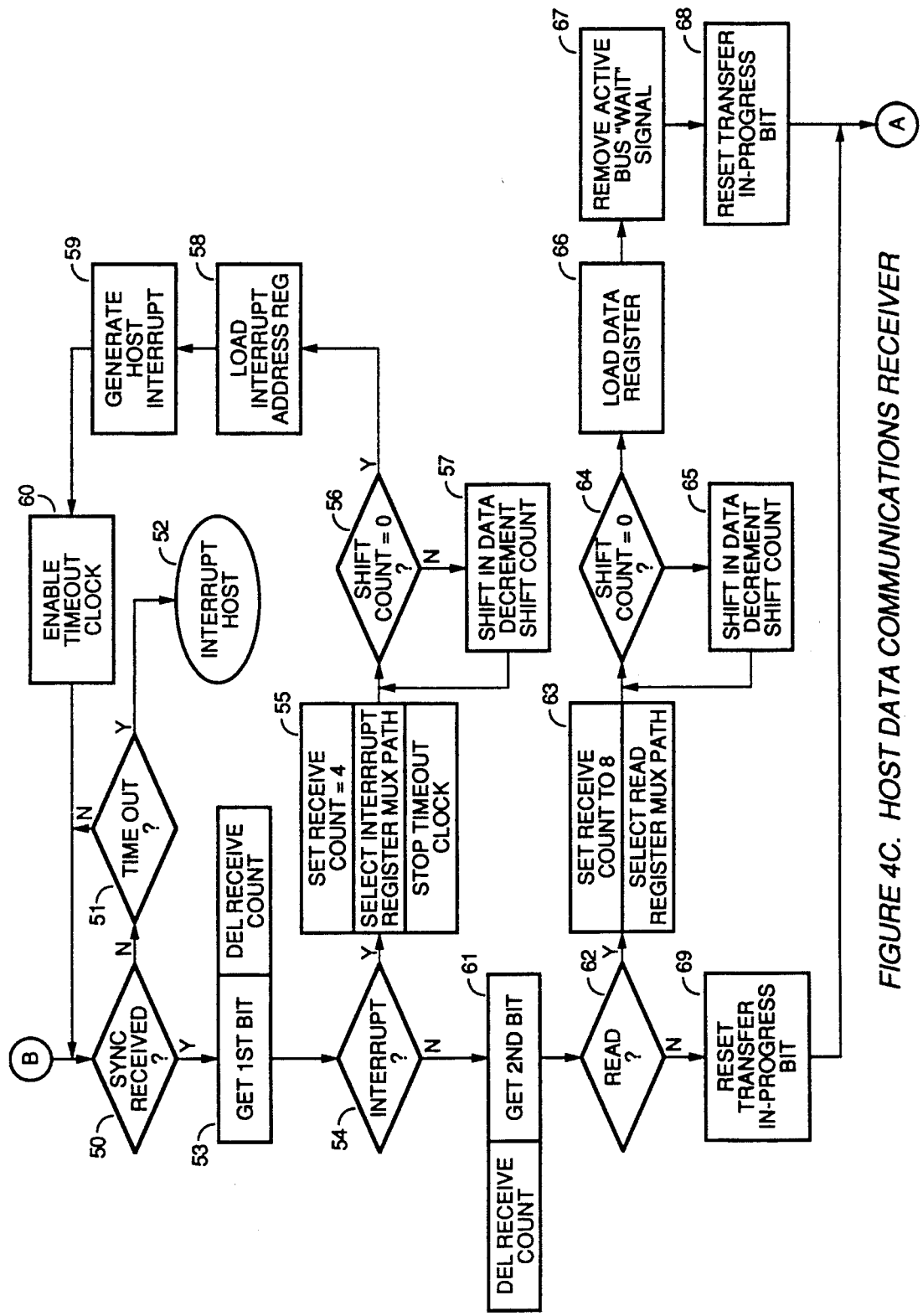

*TERMINAL DATA COMMUNICATIONS TRANSMITTER*

TERMINAL DATA COMMUNICATIONS RECEIVER

APPARATUS AND METHOD FOR COMMUNICATION BETWEEN HOST CPU AND REMOTE TERMINAL

This is a continuation of application Ser. No. 938,848, filed Dec. 8, 1986.

BACKGROUND OF THE INVENTION

1. Field of Invention

The invention relates to the field of real time, multiuser, time-share computer systems and specifically to multiuser personal computer systems for running computer software written for individual personal computers, including software that requires the interactive exchange of high resolution computer graphics information.

2. Description of Related Art

Software manufactures have developed a considerable number of software programs for the personal computer. The development of software packages, particularly for business applications, has been assisted immensely by the establishment of standard operating hardware that is accepted through out the industry. The large number of software packages that have been written for the personal computer and the enormous effort made to develop software for business applications combine to encourage hardware manufactures to develop computer systems that can run existing software.

Many software packages have been written to directly access specific elements of operating hardware found on the standard personal computer. Therefore, any computer must have direct access to the hardware found on the standard PC if that computer is to execute conventional software packages. Many software packages have also been written so that the computer can perform only one function at a time. These single tasking systems essentially tie down all the hardware on the PC so that multitasking at the PC is a nontrivial problem.

A new generation of the personal computer has recently been introduced by Compacq. At the most basic level, the 8088 microprocessor, used as the central processing unit (CPU) of current personal computers such as the IBM XT and AT series has been replaced with a vastly more powerful CPU, the 80386 microprocessor manufactured by Intel. The '386 CPU can execute the software packages written for the current generation of PC. The full capabilities of the '386 CPU, however, cannot be exploited by software written to run on a PC using the less powerful 8088 CPU.

The capabilities of the '386 CPU may be further exploited by running several applications programs concurrently. The '386 microprocessor has an extraordinary capability to link together a large number of remote, low cost work stations by appearing to each station as a separate CPU that is dedicated to serving that one station. This multitasking, multiuser mode of operation, however, is limited by the number of input/output ports available at the computer. It is physically impractical to place enough I/O ports in close enough proximity to the CPU to fully exploit the multiuser, multitasking capabilities of the '386 CPU, especially for executing software written for less powerful personal computers.

One way to more fully utilize the capabilities of a '386 CPU is to form a multiuser system of remote terminals that use the '386 CPU on a time-share basis. However, the use of remote terminals presents a problem for executing software that is written for the personal computer. The '386 CPU must have direct access to whatever operating hardware the software may request at the remote work station. For example, programs for such diverse applications as spread sheets and word processing require direct access to video memory for displaying high resolution graphics. Conventional software packages that have been written for a single user, single tasking personal computer are not compatible with a multiuser, time-share system of the type otherwise permitted by the '386 microprocessor because the software cannot access the operating hardware located at the remote terminal.

Various attempts have been made to link personal computers to permit multiple users to share both hardware and software. One common approach is the local area network (LAN). A LAN can provide peer to peer data communications but not centralized management and control of the type permitted by the new generation PC. Most LAN networks are expensive because each personal computer in the network requires a separate network card to interface with the network and the industry does not have an accepted standard LAN or LAN interface. Conventional LAN's, and other networking systems, transfer data between stations at a slow rate which is totally inadequate for the high resolution, interactive graphics contained numerous software packages.

The art recognizes a need for a multiuser computer system for executing application software including high resolution, interactive graphics packages in a real time, time-share system. The art also recognizes a need to economically link remote terminals with a central computer using hardware that is fully compatible with the software written for the single user, single tasking generation of personal computer.

SUMMARY OF THE INVENTION

The present invention provides a method and apparatus for electronically transferring data, especially high resolution video graphics data, between a remote terminal and a central processing unit that is so fast that the remote terminal functions as if it were hardwired to the CPU, i.e., data transfers are completed with one host CPU bus cycle. A high speed data link enables each remote terminal to function as if it were an element of operating hardware, such as a memory device, that is hardwired to the data bus of a host controller. The data link also enables the host controller to function as if it were hardwired to the data bus of the remote terminal. Thus, the hardware of the host controller is local to each remote terminal. Control logic encodes data for high speed transfer and separate control logic places the transferred data into a form suitable for processing on a data bus at the other end of the data link. The data link can connect personal computers in a real time, time-share network that enables remote stations to share hardware and software that is distributed at remote locations. The hardware does not require modifying the software written for the single user, single tasking generation of personal computer, including software having high resolution, interactive graphics.

In the preferred embodiment of the apparatus for implementing the present invention, the data is transferred between stations over a very high speed serial data transmission line at a rate of, for example, 25 Megabits/sec. Fiber optic duplex cables connect a host controller with one or more remote terminals. One fiber optic cable carries the data from the host to the remote terminal and the other cable carries data from the remote terminal to the host controller. Specially dedicated, high speed, hardwired electronic logic, such as 74F series TTL hardwired logic, encodes the parallel stream of data from a first data bus to a serial data format, transfers the data over a serial data link, and decodes the data at a second data bus back into a parallel stream so that slower speed hardware may direct the data to the appropriate operating hardware.

The remote terminal may execute applications software contained at the host controller as if the software were run on hardware that is hardwired to the data bus of the remote terminal. The host controller may execute existing personal computer software, without modification, in response to commands from the remote terminal because the software has direct access to all operating hardware on the data bus of the remote terminal. For example, an interactive computer graphics package that is executed on the host controller has direct access to the video memory of the remote terminal over the data link so that the graphics may be both displayed and modified at the remote terminal in real time. Different remote terminals may execute different software at the host controller so that the host controller functions in a multitasking, multiuser mode. The host controller may access hardware at the remote terminal that is unrelated to the demands of the particular software package then being accessed by the remote terminal so that the remote terminals also may operate in a multitasking mode. Thus, the present invention permits a multiple number of remotely positioned terminals to function in a real time, multitasking, multiuser, time-share computer system independently of the graphics resolution or hardware demands of the software.

The present invention greatly simplifies the connections required to transfer data, particularly video information, between computers and remote terminals. The relatively simple hardware required to implement the present invention reduces the cost of the data link. Further, the simplicity of the method by which the data is transferred also permits establishing an industry standard for electronic data transfer between computers and remote terminals.

The invention is illustrated with a system for connecting a number of relatively unsophisticated remote terminals to a host controller. The host controller executes the applications software in response to commands received from the remote terminals in real time on an interactive, time-share basis. Alternately, the invention permits linking remote, autonomous personal computers in an interactive, real time network so that the PC's can exchange information, including video information, in real time.

BRIEF OF DESCRIPTION OF THE DRAWINGS

FIG. 4c is a flow chart of the logic steps for receiving data at the host controller;

DETAILED DESCRIPTION OF THE PREFERRED EMBODIMENT

Figure 1:
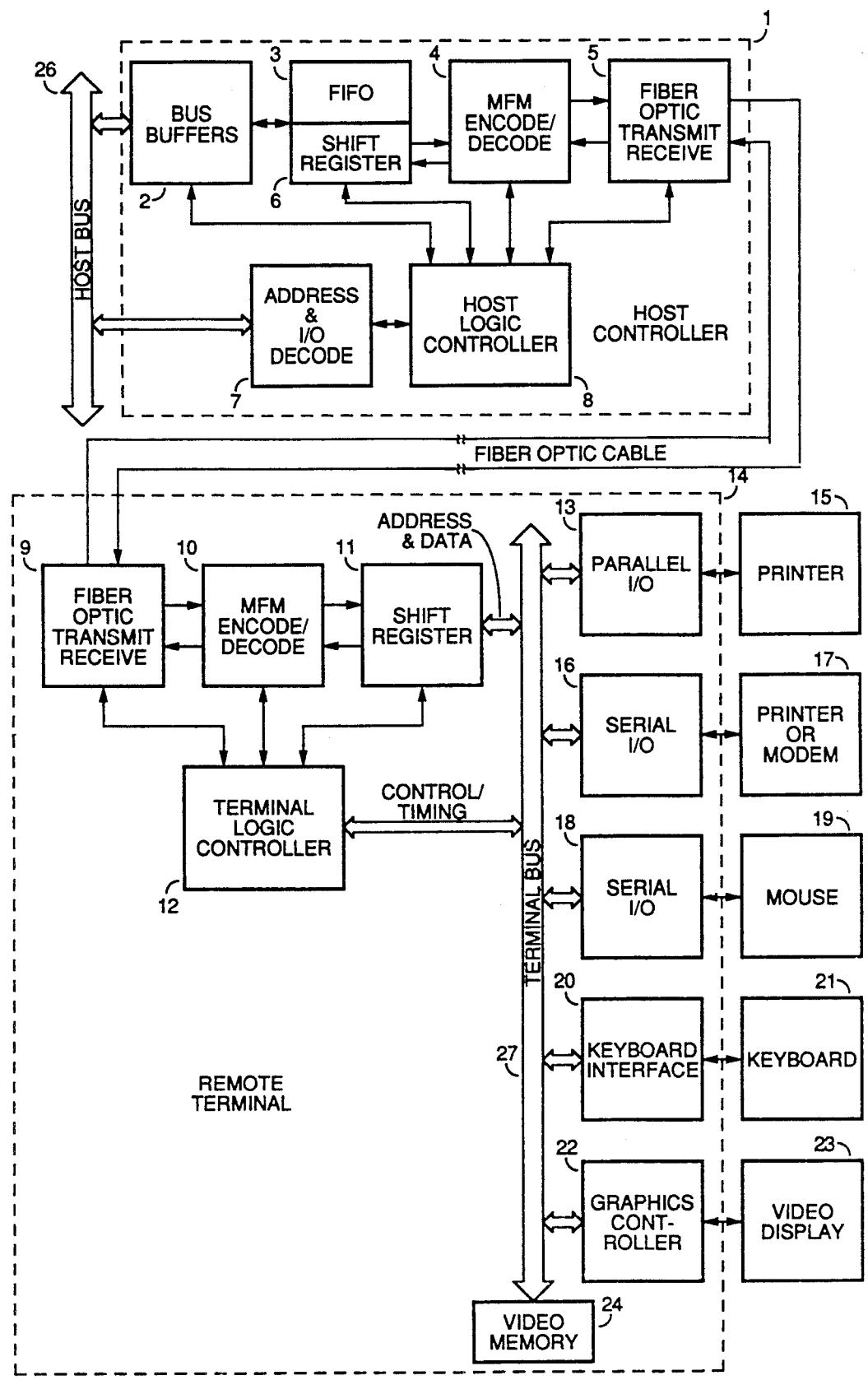
FIG. 1 is a block diagram graphics terminal and associated host controller for implementing the present invention.

FIG. 1 is a block diagram of the remote graphics terminal system for a remote terminal and host controller according to the present invention. Printer 15, modem 17, mouse 19, keyboard 21 and video display unit 23 are input/output devices for a personal computer that are well known in the art. Remote terminal 14 comprises parallel port 13, serial port 16, serial port 18, key board interface unit 20 graphics controller 22 and video memory unit 24 which are hardware elements of a personal computer well known in the art as found on the IBM XT or AT series PC. Elements 13, 16, 18, 20 and 22 are connected to a remote terminal bus 27. Remote terminal bus 27 also exchanges data with a fiber optic transmitter/receiver unit 9 through MFM encode/decode unit 10 and shift register 11 under the control of terminal logic controller 12. The MFM unit operates on a pulsed form of the Miller code. Host controller 1 comprises a host data bus 26 which exchanges data with fiber optic transmit receive unit 5 through bus buffer 2, FIFO register 3 and MFM encode/decode unit 4 under the control of host controller 8. Alternately, other encode/decode methods, such as Manchester II or 4B5B, could be used. As used herein, the word "remote" shall refer to a device which is not hardwired to the host controller bus, and communicates with the host controller through a communications link, and the word "local" shall refer to a device which is hardwired to the host controller bus.

The interactive hardware logic and communications system of the host controller 1 and remote terminal 14 are constructed such that remote terminal bus 27 appears to physically reside in a memory unit hardwired to host bus 26. Thus, data from remote terminal bus 27 may be accessed as data from a conventional memory unit within a single host bus cycle. As those of ordinary skill in the art will readily recognize from this disclosure, the term "single host bus cycle" when used herein shall mean a single read cycle or a single wire cycle by which the host CPU either reads data from the CPU bus or writes data to the PCU bus as is well known in the microprocessor art. Address and input/output decoder unit 7 accepts commands from the host bus 26 and operates in combination with host logic controller 8, bus buffers 2, FIFO unit 3 and shift register 6. Selective transfer commands are directed to the remote terminal 14 through MFM encoder/decoder unit 4.

A high speed data link, preferably includes fiber optic transmit and receive units 5 and 9, which may be any optical fiber transmission system that is capable of transmitting at 25 megahertz or higher. One such system is manufactured by the Hewlett Packard Corporation of San Jose, CA. Fiber optic transmit/receive units 5 and 9 use a duplex cable having two fiber optic cables. One fiber optic cable carries signals from host controller 1 to remote terminal 14 while the second cable carries signals from remote terminal 14 to host controller 1. Also, fiber optic cable is preferred over coaxial cable because fiber optic cable can transmit data at a faster speed that is more appropriate for handling the high speed serial data transmission required by the present invention. Fiber optic cable does not emit electromagnetic radiation and is not susceptible to electromagnetic interference as is coaxial cable.

The MFM encode/decode units 4 and 10 and logic controllers 8 and 12 may be made from 74F series high speed TTL logic such as manufactured by Fairchild. The logic is preferably hardwired to form a Richardson controller that is specially dedicated to the specific task of controlling data processing. The controllers encode parallel data from one data bus into a serial data stream and decode the serial data back to a parallel stream in the format of the receiving bus "on the fly", in real time as the data is generated. The logic controllers might be replaced with a general purpose microprocessor capable of executing the programming with sufficient speed, although no microprocessor known at present has sufficient processing speed. The bus buffer 2, address and decode unit 7, FIFO unit 3 and shift registers 6 and 11 may be made from slower speed LS logic. Host bus 26 may be any of several data bus configurations such as Multibus, VME, Q-BUS, or the data bus used on the IBM Models XT and AT personal computers. The FIFO units 3 and 11, however, should not be used with this later bus because, the period of time required to empty the FIFO may exceed the time needed for the bus to take part in memory refresh. With a higher performance bus, however, the FIFO enables the host controller 8 to continue transferring data to the remote terminal while the CPU on the host bus does something else. Thus, the FIFO's reduce the number of times that the CPU must address each remote terminal.

As presently contemplated, host logic controller 8 and terminal logic controller 12 provide all timing and control functions necessary to transfer data between the remote terminal and host controller. To ensure that the remote terminal is physically "mapped" onto the host controller, it is necessary that the encode, decode and transfer operations occur on the fly, which typically involves processing at very high speed such as 25MHz or higher. The data bus is dedicated primarily to updating the video memory with much less time processing time being spent communicating with the CPU.

The type of data bus used at the host controller or remote terminal may establish a minimum rate for data transfer. Some busses, such as found on the IBM XT and AT series personal computers are used in the process of periodically refreshing the DRAM memory. If the transfer rate is too slow, the refresh time is exceeded before a message transfer is completed. While the minimum time varies depending on the particular data bus, it is believed that the transfer rate must be at least 15 Megabits/sec. It is to be appreciated, however, that a higher performance data bus which is not used for memory refreshing does not have a minimum transfer rate.

Address and input/output decoder 7 transfers requests for memory write and output write commands from host bus 26 to host logic controller 8. The host controller coordinates the transfer of data through bus buffers 2 and optional FIFO 3 or shift register 6. The serialized data is encoded by MFM encode and decode unit 4 for transmission by fiber optic transmitter 5.

A signal receiver in fiber optic transmitter/receiver unit 9 receives the optical signal and transfers data to a MFM encode/decode Unit 10. The incoming signal, is buffered in shift register unit 11 until remote terminal logic controller 12 determines that the transmission is complete. The terminal controller then provides control and timing information to remote terminal bus 27 so that the output from shift register 11 may be directed to the appropriate output port or memory location. After a period of time sufficient to transfer data, terminal logic controller 12 sends an acknowledgment signal to the host controller. The format of the acknowledgment signal is illustrated in FIG. 3c.

Host data bus 26 carries memory and input read commands with two restraints. The first restraint is that the CPU of the host controller (not shown) must wait for all previously received access requests to the terminal to be emptied from the buffer before receiving the next read information and resuming normal operation. The second restraint is that the terminal controller 12 must use a slightly different data format, shown of FIG. 3b, to return the requested data from a memory or input port.

Remote terminal controller 12 generates an interrupt request to the host controller 8 to request an interrupt on host bus 26 in response to an interrupt generated by any of its peripheral devices 15, 17, 19 or 21. The host controller 8 maintains the information on the source of the interrupt in address and decode unit 7 for transfer to host data bus 26.

Figure 2:
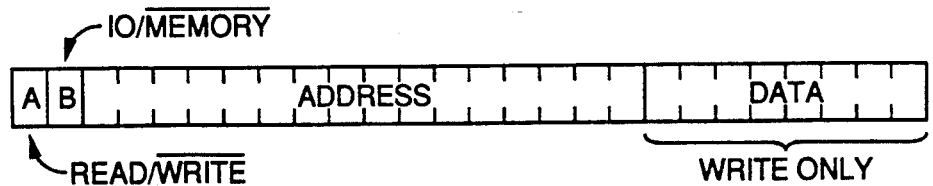
FIG. 2 represents a format for transmitting data from the host controller to the remote terminal.

FIG. 2 illustrates the format for data contained in a host initiated command. The first two bits of the frame, A and B, determine whether the command is a read or write command and whether the data transfer is directed to an I/O port or to a memory device. The bits that follow contain the address of the data. Data bits follow the address only if the command is a write command. Thus, placing the read/write bits in front of the address eliminates having to read the eight bits of data when the command is a read command.

Figure 3A:
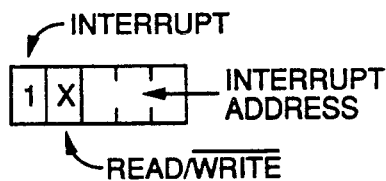
FIG. 3a represents the format for directing interrupt requests from the remote terminal to the host controller.

FIG. 3a illustrates the format of an interrupt request directed from the remote terminal to the host; controller. A true value in the first bit indicates to the host that the received message is an interrupt address The remaining bits define the address of the source of the interrupt.

Figure 3B:
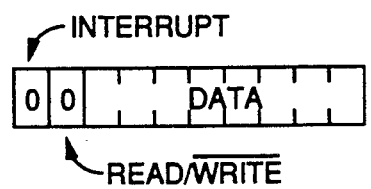
FIG. 3b represents the format for returning data from the remote terminal to the host controller in response to a read request from the host controller.
Figure 3C:
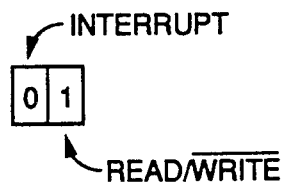
FIG. 3c represents the format for a write acknowledge directed from the remote terminal to the host controller.

FIG. 3b illustrates the format for acknowledging a read command. The first bit is a 0 or "false" followed by a 0 or "false". The following bits contain the data requested by the host controller.

FIG. 3c illustrates the data format for acknowledging a write command in which the interrupt bit is set to 0 or "false" and the read bit is set to 1 or "true".

The transmission of the data between the host controller and the remote terminal be done either in a synchronous or asynchronous format. The synchronous format is conceptually easier to implement but requires more processing hardware to distinguish between a null transmission and real data. In addition to requiring less hardware, the asynchronous format is faster because the logic controllers need not recognize a data transmission since no signal is transmitted unless data is also being transmitted. The asynchronous format, however, is more difficult to implement. The preferred embodiment of the present invention comprises a hybrid transmission format in which synchronous data transmissions are transmitted asynchronously. The logic controllers have no difficulty in recognizing data because no signal is transmitted unless data is also present. The process of decoding the data at the receiving controller, however, is essentially that for decoding synchronous data. The hybrid transmission format set forth in detail below is considered to produce the maximum rate of data transfer with the minimum amount and complexity of hardware.

Figure 4A:
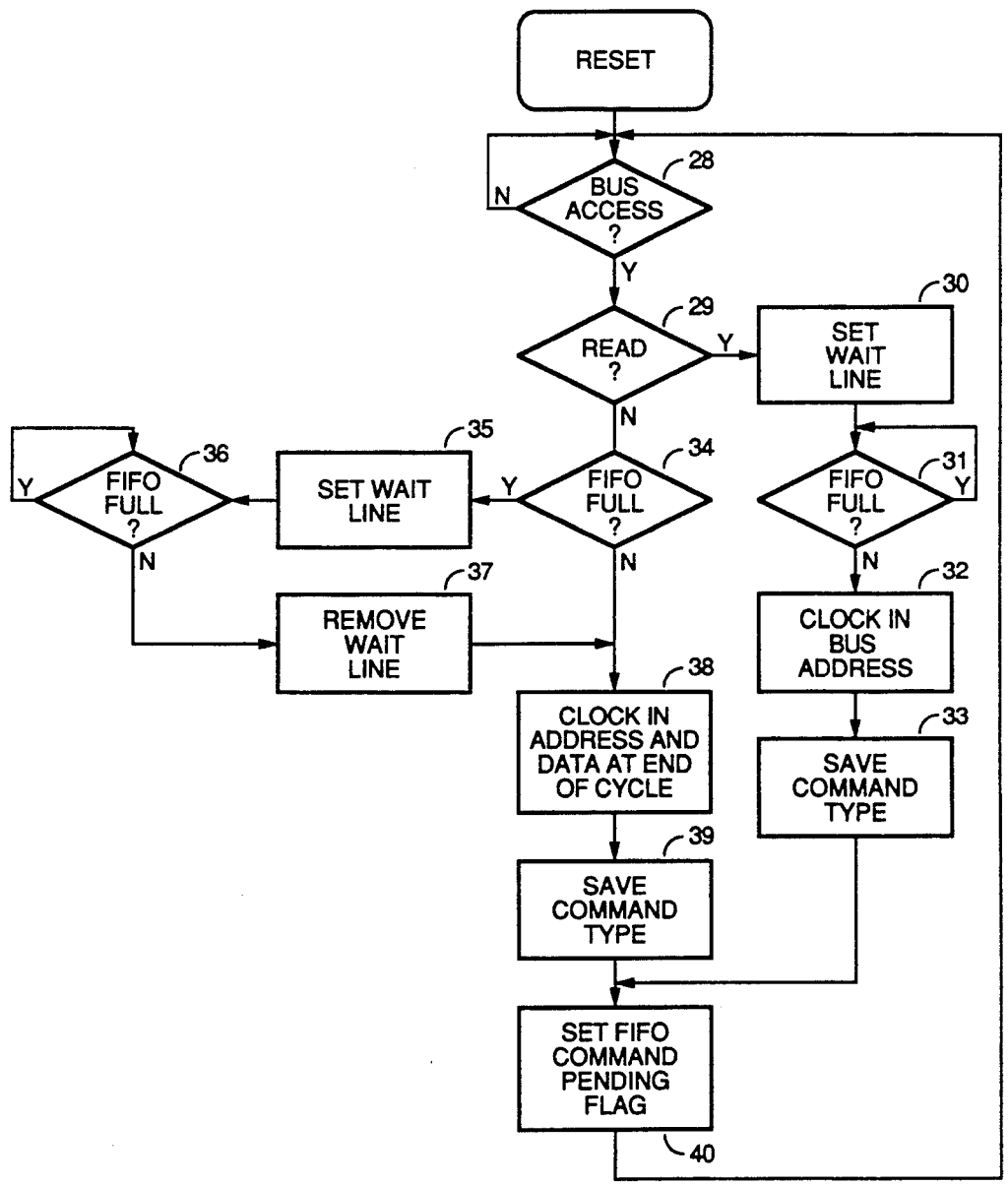
FIG. 4a is a flow chart of the logical steps performed in receiving data at the host controller.

FIG. 4a is a flow chart of logic operations at the host controller that occur in response to an initiation request from the host bus. The host controller remains in an idle state until a bus access occurs at step 28. If the request from the host is determined to be a "read" request at step 29, a wait request line is activated at step 30. The host controller 8 then waits until room is available in FIFO memory buffer 3. Once space is available, the controller clocks the bus address at step 32 and saves the command type at step 33. A "FIFO command pending" flag is set at step 40 which initiates the processing steps shown, in FIG. 4b. If the command was not a "read a" at step 29, i.e., it was a "write" then the controller 8 determines at step 34 if the FIFO buffer is full. If the FIFO buffer is full, a wait line to the host is set at step 35 and the FIFO status is monitored at step 36 until space is available at which time the wait line is removed as step 37. The address and data is then clocked in at the end of the next cycle as step 38 and the command type is saved at step 39. The "FIFO command pending" flag is set which activates the process shown in FIG. 4b. If the FIFO was not full at step 34, a wall step is unnecessary and the address and data is clocked in at step 38, the command type is saved at step 39 and the "FIFO command pending" flag is set at step 40.

Figure 4B:
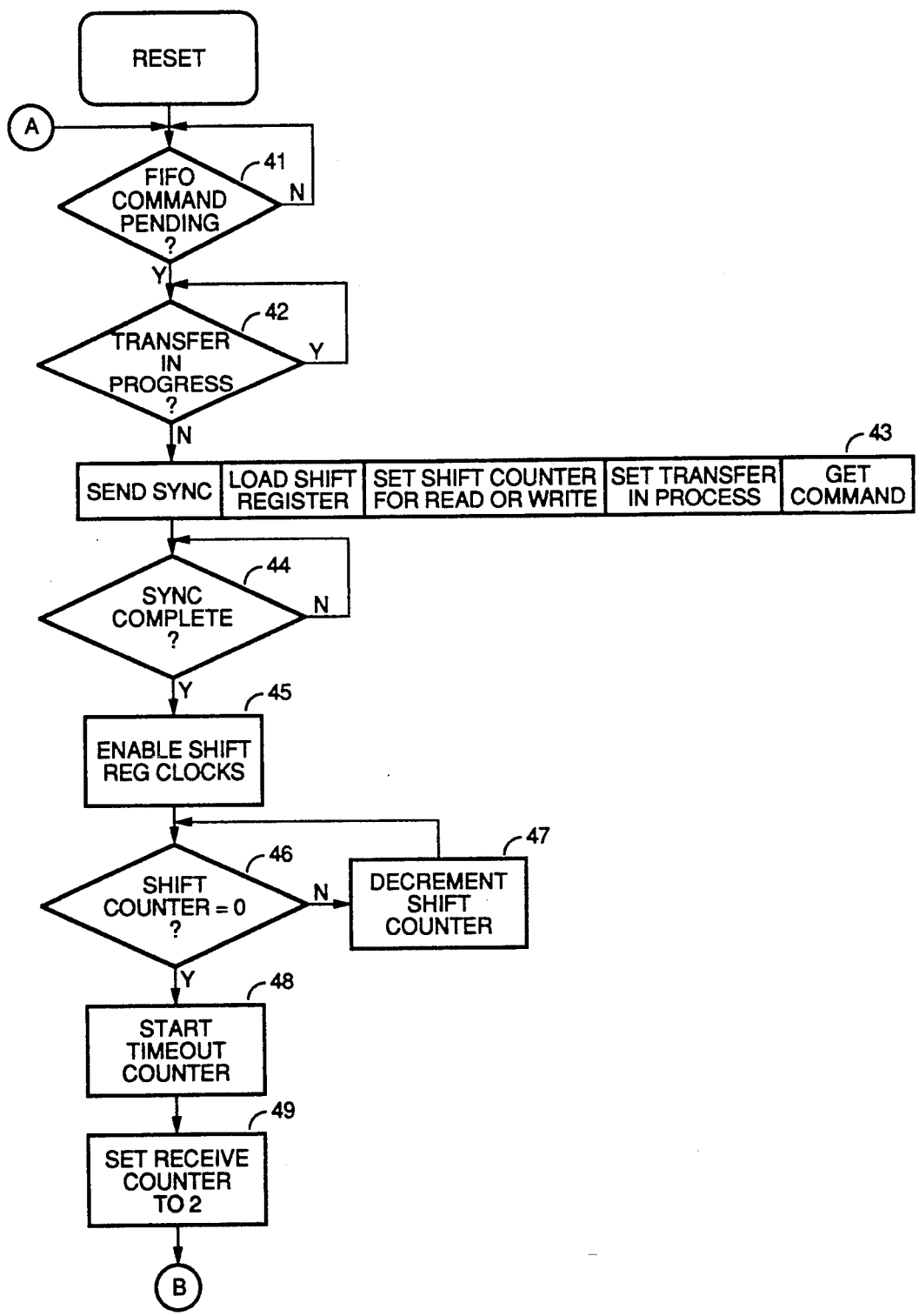
FIG. 4b is a flow chart of the logic steps executed in transmitting data from the host controller.

FIG. 4b describes the host data communications transmitter operations. The host logic controller 8 monitors the FIFO command pending flag at step 44. When the flag is set, the controller waits if another transfer is in process as step 42. Once the previous transfer is complete, synchronization SYNC bits are transmitted, the shift register is loaded, the shift counter is set for read or write as appropriate, a "transfer-in-progress" flag is set, and the command is loaded at step 43. A delay occurs until SYNC is completed at step 44 at which time the shift register clocks are enabled at step 45. The shift counter is tested for equality to zero at step 46. If not equal to zero, the counter is decremented at step 47 and checked again at step 46. When the counter equals zero, a time-out counter is initiated at step 48 and the receive counter is set equal to 2 at step 49.

FIG. 4c illustrates the host data communications receiver logic which begins awaiting a response from the remote terminal 14. The MFM decoder 4 is monitored for SYNC step 50 or a time-out counter step 51. If a time-out occurs, the host processor is interrupted at step 52 to signify an error condition. If the SYNC is received at step 50, the host controller 8 extracts the first bit and decrements the receive count at step 53. The host controller then checks the first bit to see if it is an interrupt at step 54. If so,. the controller sets the receive count equal to 4, selects the interrupt register multiplexer path and stops the time-out clock at step 55. The shift count is tested for equality to zero at step 56. If the shift count is not equal to zero at step 56, the data is shifted into the shift register 6 and the shift count is decremented. If the shift count is equal to zero at step 56, the interrupt address register is loaded at step 58, an interrupt is generated at step 59 and the time-out clock is enabled at step 60. The process then reenters the loop which tests for SYNC received at step 50 and a time-out at step 51. If the first bit detected at step 53 was not an interrupt at step 54, then the receive count is decremented and the second bit extracted at step 61. The second bit is tested for a read value at step 62 which, if "true", sets the receive count equal to 8 and selects the read register multiplexer path at step 63. The shift count is tested for equality to zero at step 64. If the count is zero, data is shifted into the shift register and the shift count is decremented at step 65. When the shift count equals zero, the data register is loaded at step 66, the host bus wait signal is deactivated at step. 67, and the "transfer-in-progress" bit is reset at step 68. If the second bit at step 61 is not a read at step 62, the "transfer-in-progress" bit is reset. After the "transfer-in-progress" bit is reset at either steps 68 or 69, the controller resumes testing the "FIFO command pending" flag at step 41.

Figure 5A:
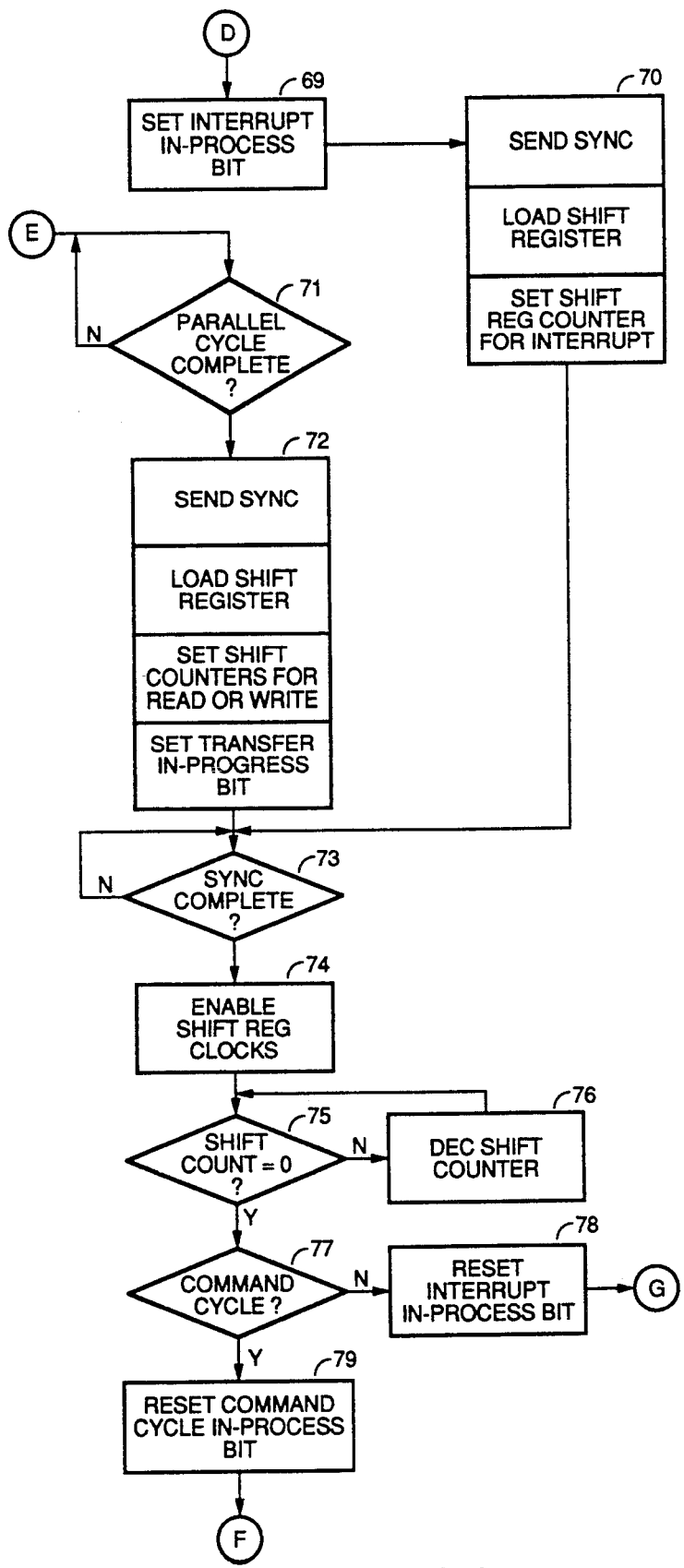
FIG. 5a is a flow chart of the logic steps for transmitting data from a remote terminal.
Figure 5B:
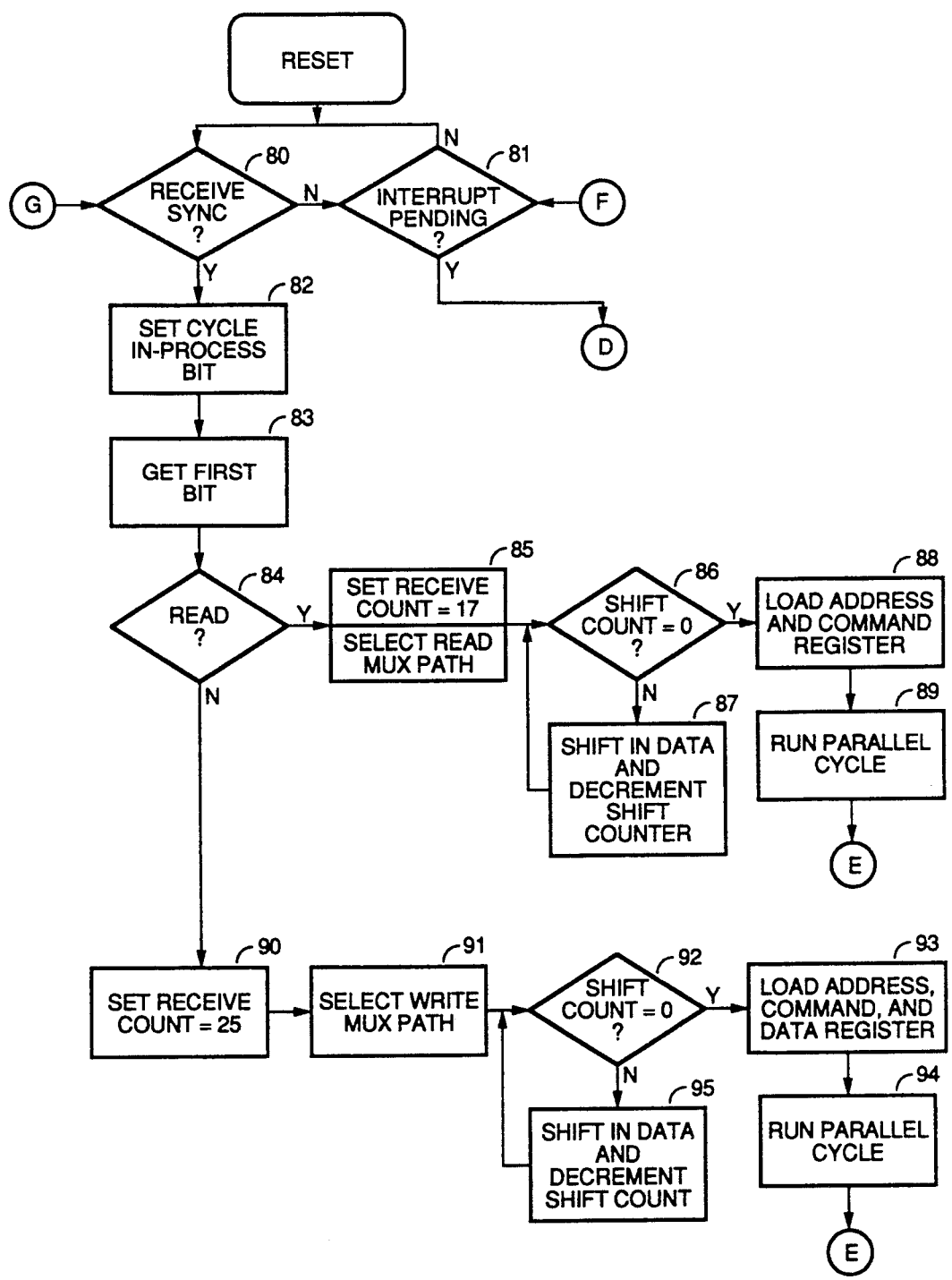
FIG. 5b is a flow chart of the logic steps for receiving data at the remote terminal.

FIG. 5b is a flow chart of the functions of the data communications receiver for the remote terminal. The remote terminal logic controller 12 begins by continuously testing for received SYNC at step 80, and an interrupt pending flag at step 81. If SYNC is received at step 80, a "cycle-in-progress" bit is set at step 82 and the first bit is extracted and tested for a "true" read value at step 84. A read command sets the receive count equal to 17 and selects the read multiplexer path at step 85. The shift count is tested for zero at step 86 which, if false, shifts data and decrements the shift counter at step 87. When the shift count equals zero, the address and command registers are loaded at step 88 and the parallel cycle is initiated at step 89 to place this information or remote bus 27. If the first bit at step 83 is not a read at step 84, then the receive count is set equal to 25 at step 90 and the write multiplexer path is selected at step 91. The shift count is checked for zero at step 92 which, if "false", shifts the data and decrements the shift count as step 95. When the shift count does equal zero, the address, command, and data registers are loaded at step 93 and the parallel cycle is initiated at step 94.

FIG. 5a is a flow chart of the logic steps involved in transmitting communications data from the host controller to the remote terminal. Once the parallel cycle has been initiated from either a read command at step 89 or a write command at step 94, the remote terminal logic controller 1 2 waits for the completion of the parallel cycle at step 71. The remote terminal logic controller then sends a SYNC, loads the shift registers, sets the shift counters for read or write as appropriate, and sets the "transfer-in-progress" bit at step 72. The remote terminal logic controller 12 waits for the end of the SYNC pattern at step 73 at which time the remote terminal logic controller enables the shift register clocks at step 74. The shift counter is checked for zero at step 75 and decremented if not equal to zero at step 76. If the shift count does equal zero at step 75, the controller determines if a command cycle exists at step 77 which, if "true", resets the command "cycle-in-progress" bit at step 79. If the command cycle is not true at step 77, the "interrupt-in-progress" bit is set at step 78 and the processing returns to testing for received SYNC or interrupt pending at step 81. If an interrupt is pending at step 81, the "interrupt-in-progress" bit is set at step 69, SYNC is initiated,.the shift registers are loaded and the shift register counter is set for interrupt. The interrupt message is then transmitted to the host in the same manner as a read or write message as previously described. At the end of the interrupt message the "interrupt-in-progress" flag is reset. The controller 12 begins testing for SYNC at step 80 as previously described.

The principles, preferred embodiments and modes of operation of the present invention have been described in the foregoing specification. The invention which is intended to be protected herein, however, should not be construed as limited to the particular forms described as these are to be regarded as illustrative rather than restrictive. Variations and changes may be made by those skilled in the art without departing from the spirit of the invention. Accordingly, the foregoing detailed description should be considered exemplary in nature and as not as limiting to the scope and spirit of the invention set forth in the appended claims.

What is claimed is:

1. Apparatus for enabling a host CPU in a host computer, running an application program written to randomly access memory and input/output devices hardwired to a host bus, to randomly read from a write to a remote memory or input/output device within a single host CPU bus cycle in a manner transparent to said application program without protocol or translation as if the remote device was hardwired to the host bus, including:
    first means, associated with said host computer, for converting host computer information, including data, addresses, and control signals on said host bus to a form suitable for transmission to said remote device over a high-speed data link within a first portion of said single host CPU bus cycle,
    second means, associated with said remote device, for converting remote device information, including data, addresses, control signals, interrupt requests and acknowledgements in said remote device to a form suitable for transmission to said host computer over a high-speed data link within a second portion of said single host CPU bus cycle,
    full-duplex, high-speed communication means, coupled to said host computer and said remote device, for transmitting said host computer information to said remote device and said remote device information to said host computer within a third portion of said single host CPU bus cycle,
    third means, associated with said host computer, and communicating with said full-duplex, high-speed communication means, for converting said remote device information to data, addresses, controls signals, interrupt requests and acknowledgements compatible with said host bus and placing them on said host bus at times compatible with normal operation of said host bus within a forth portion of said single host CPU bus cycle, and
    fourth means, associated with said remote device, and communicating with said full-duplex, high-speed communication means, for converting said host computer information to data, addresses and control information compatible with said remote device bus and placing them on said remote device bus at times compatible with normal operation of said remote device bus within a fifth portion of said single host CPU bus cycle whereby said portions occur within said host CPU bus cycle whereby said portions occur within said single host CPU bus cycle.

2. Apparatus for enabling a host CPU in a host computer, running an application program written to randomly access memory and input/output devices hardwired to a host bus, to randomly read from or write to a remote memory or input/output device within a single host CPU bus cycle in a manner transparent to said application program without protocol or translation as if the remote device was hardwired to the host bus, including:
    data buffer means, associated with said host computer, having an outgoing portion, communicating with said host bus, for transferring host computer outgoing parallel data from said host bus within a first portion of said single host CPU bus cycle,
    address and control buffer means, associated with said host computer, and communicating with said host bus, having an outgoing portion, for transferring host computer outgoing addresses and control signals from said host bus within a second portion of said single host CPU cycle,
    host parallel-to-serial/serial-to-parallel converter means, associated with said host computer and communicating with said data buffer means and said address and control buffer means, for converting host information to be sent from said host computer, including data, addresses, and control signals, from parallel to serial form, and for converting remote device information received from said remote device, including data, addresses, control information, interrupt requests, and acknowledgement signals, from serial to parallel form within a third portion of said single host CPU cycle,
    an incoming portion in said data buffer means, communicating with said host parallel-to-serial/serial-to-parallel converter means, for placing data from said remote device information on said host bus within a forth portion of said single host CPU cycle,
    an incoming portion in said address and control buffer means, communicating with said host parallel-to-serial/serial-to-parallel converter means, for placing addresses and control signals from said remote device information on said host bus within a fifth portion of said single host CPU cycle,
    host information conditioning means, associated with said host computer and communicating with said host parallel-to-serial/serial-to-parallel converter means, for conditioning host information in serial form for transmission to said remote device, and for conditioning remote device information in serial form received by said host computer within a sixth portion of said single host CPU cycle,
    host transmitter/receiver means, associated with said host computer, and communicating with said host information conditioning means, for transmitting host information in serial form to said remote device, and for receiving remote device information in serial form from said remote device within a seventh portion of said single host CPU cycle,
    remote device parallel-to-serial/serial-to-parallel conversion means, associated with said remote device and communicating with a remote device bus in said remote device for converting remote device information to be sent from said remote device, including data, addresses, control signals, interrupt requests and acknowledgement signals, from parallel to serial form, and for converting host information received from said host computer, including data, addresses, and control signals, from serial to parallel form within a eighth portion of said single host CPU cycle,
    remote device information conditioning means, associated with said remote device and communicating with said remote device parallel-to-serial/serial-toparallel conversion means, for conditioning remote device information in serial form for transmission to said host computer and for conditioning host information in serial form received from said host computer, remote device transmitter/receiver means, associated with said remote device and communicating with said remote device information conditioning means and said host computer transmitter/receiver means, for transmitting remote device information in serial form to said host computer, and for receiving host information to serial form from said host computer within a nineth portion of said single host CPU bus cycle.

host controller means, associated with said host computer, and communicating with said data buffer means, said address and control buffer means, said host parallel-to-serial/serial-to-parallel converter means, said host information conditioning means, and said host transmitting/receiving means, for controlling and coordinating the data process in said host computer, remote device controller means, associated with said remote device, and communicating with said remote device parallel-to-serial/serial-to-parallel conversion means, said remote device information conditioning means, and said remote device transmitter/receiving means, for controlling and coordinating the data process in said remote device, for generating timing and control signals in response to host information received by said remote device, and for generating interrupt requests and acknowledgement signals in response to events occurring on said remote device bus whereby said portions occur within said single host CPU bus cycle.

* * * * *